US012162759B2

(12) United States Patent
Vu

(10) Patent No.: US 12,162,759 B2
(45) Date of Patent: *Dec. 10, 2024

(54) METHOD FOR THE MANUFACTURE OF REDUCED GRAPHENE OXIDE FROM KISH GRAPHITE

(71) Applicant: ARCELORMITTAL, Luxembourg (LU)

(72) Inventor: Thi Tan Vu, Oviedo (ES)

(73) Assignee: ArcelorMittal, Luxembourg (LU)

( * ) Notice: Subject to any disclaimer, the term of this patent is extended or adjusted under 35 U.S.C. 154(b) by 971 days.

This patent is subject to a terminal disclaimer.

(21) Appl. No.: 17/051,702

(22) PCT Filed: Apr. 5, 2019

(86) PCT No.: PCT/IB2019/052805
§ 371 (c)(1),
(2) Date: Oct. 29, 2020

(87) PCT Pub. No.: WO2019/220228
PCT Pub. Date: Nov. 21, 2019

(65) Prior Publication Data
US 2021/0221688 A1 Jul. 22, 2021

(30) Foreign Application Priority Data
May 16, 2018 (WO) .................. PCT/IB2018/053416

(51) Int. Cl.
| C01B 32/198 | (2017.01) |
| C01B 32/19 | (2017.01) |
| C01B 32/194 | (2017.01) |
| C01B 32/196 | (2017.01) |
| C01B 32/23 | (2017.01) |

(52) U.S. Cl.
CPC ............ *C01B 32/198* (2017.08); *C01B 32/19* (2017.08); *C01B 32/194* (2017.08); *C01B 32/196* (2017.08); *C01B 32/23* (2017.08); *C01B 2204/04* (2013.01); *C01B 2204/30* (2013.01); *C01B 2204/32* (2013.01); *C01P 2006/32* (2013.01); *C01P 2006/40* (2013.01)

(58) Field of Classification Search
CPC .................................................... C01B 32/198
See application file for complete search history.

(56) References Cited

U.S. PATENT DOCUMENTS

| 4,075,114 | A | 2/1978 | Ishikawa |
| 5,330,680 | A | 7/1994 | Sakawaki et al. |
| 11,390,529 | B2 * | 7/2022 | Vu .......................... C01B 32/184 |
| 2010/0055458 | A1 | 3/2010 | Jang et al. |
| 2011/0280787 | A1 | 11/2011 | Chen |
| 2013/0197256 | A1 | 8/2013 | Wu et al. |
| 2014/0154164 | A1 | 6/2014 | Chen |
| 2014/0242275 | A1 | 8/2014 | Zhamu et al. |
| 2014/0248214 | A1 | 9/2014 | Hersam et al. |
| 2015/0093324 | A1 | 4/2015 | Thevasaharam |
| 2015/0158729 | A1 | 6/2015 | Wu et al. |
| 2015/0218002 | A1 | 8/2015 | Plomb et al. |
| 2016/0096735 | A1 | 4/2016 | Savsunenko et al. |
| 2016/0228846 | A1 | 8/2016 | Chen et al. |
| 2016/0236939 | A1 | 8/2016 | Miguel et al. |
| 2016/0272499 | A1 | 9/2016 | Zurutuza |
| 2016/0347619 | A1 | 12/2016 | Chang et al. |
| 2017/0049814 | A1 | 2/2017 | Sawosz et al. |
| 2018/0072573 | A1 | 3/2018 | Chaki et al. |
| 2018/0339906 | A1 | 11/2018 | Lu et al. |

FOREIGN PATENT DOCUMENTS

| CN | 102198938 A | 9/2011 |
| CN | 102431998 | 5/2012 |
| CN | 103738955 A | 4/2014 |
| CN | 103879990 A | 6/2014 |
| CN | 103910354 A | 7/2014 |
| CN | 105084344 A | 11/2015 |
| CN | 105293476 A | 2/2016 |
| CN | 105948033 A | 9/2016 |
| CN | 106145101 A | 11/2016 |
| CN | 107572511 A | 1/2018 |
| CN | 107673338 | 2/2018 |
| CN | 104059618 B | 4/2018 |
| JP | S4999986 A | 9/1974 |
| JP | S49112898 A | 10/1974 |
| JP | S51109914 A | 9/1976 |
| JP | S5344917 B2 | 12/1978 |
| JP | S6369705 A | 3/1988 |
| JP | H02153810 A | 6/1990 |

(Continued)

OTHER PUBLICATIONS

Ching-Yuan Su et al, "Electrical and Spectroscopic Characterizations of Ultra-Large Reduced Graphene Oxide Monolayers". (Chemistry of materials, 20091208 American Chemical Society). vol. 21. No. 23. pp. 5674-5680.

Han Seo et al, "Pool Boiling CHF of reduced graphene oxide, graphene, and SiC-coated surfaces under highly wettable FC-72". (International Journal of Heat and Mass Transfer). vol. 82. pp. 490-502.

International Search Report of PCT/IB2019/052805, Jul. 18, 2019.

L. Stobinski et al., "Graphene oxide and reduced graphene oxide studied by the XRD, TEM and electron Spectroscopy methods", Journal of Electron Spectroscopy and Related Phenomena., NL, (Aug. 1, 2014), vol. 195, ISSN 0368-2048, pp. 145-154.

(Continued)

*Primary Examiner* — Stuart L Hendrickson
(74) *Attorney, Agent, or Firm* — Davidson Kappel LLC

(57) ABSTRACT

A method for the manufacture of reduced graphene oxide from Kish graphite including the pretreatment of kish graphite, the oxidation of pre-treated kish graphite into graphene oxide and the reduction of graphene oxide into reduced graphene oxide, the reduced graphene oxide and the use of the graphene oxide.

20 Claims, 1 Drawing Sheet

(56) References Cited

FOREIGN PATENT DOCUMENTS

| | | |
|---|---|---|
| JP | H0647315 A | 2/1994 |
| JP | H1017313 A | 1/1998 |
| JP | 2012131691 A | 7/2012 |
| JP | 2012515705 A | 7/2012 |
| JP | 2013212975 A | 10/2013 |
| JP | 2014001126 A | 1/2014 |
| JP | 2016190781 A | 11/2016 |
| JP | 2016534958 A | 11/2016 |
| KR | 20160082721 A | 7/2016 |
| KR | 101109961 B1 | 2/2020 |
| WO | WO2017027731 A1 | 2/2017 |
| WO | WO2017048027 A1 | 3/2017 |
| WO | WO2018178842 | 10/2018 |
| WO | WO2018178845 | 10/2018 |
| WO | WO2019/220226 A1 | 11/2019 |
| WO | WO2019/220227 A1 | 11/2019 |
| WO | WO2019/224619 A1 | 11/2019 |
| WO | WO2019/224620 A1 | 11/2019 |

OTHER PUBLICATIONS

Jung-Chul An et al., "Preparation of Kish graphite-based graphene nanoplatelets by GIC (graphite intercalation compound) via process", Journal of Industrial and Engineering Chemistry, Korea, (Jun. 1, 2015), vol. 26, ISSN 1226-086X, pp. 55-60.

Morimoto et al.: "Tailoring the oxygen content of graphite and reduced graphene oxide for specific applications", Scientific Reports, vol. 6, No. 1, Feb. 25, 2016.

Z-S Wu et al, "Synthesis of high-quality graphene with a predetermined number of layers", Carbon,, (Nov. 5, 2008), vol. 47, pp. 493-499.

Jinguao Song et al.: "Preparation and Characterization of Graphene Oxide", Journal of nanomaterials, vol. 2014, Jan. 2014, pp. 1-6.

Munuera, J. M., et al. "High quality, low oxygen content and biocompatible graphene nanosheets obtained by anodic exfoliation of different graphite types." Carbon 94 (2015): 729-739.

Zhang, Ming, et al. "Production of graphene sheets by direct dispersion with aromatic healing agents." Small 6.10 (2010): 1100-1107.

Javad Rafiee: "Wetting transparency of graphene", Nature Materials, Mar. 1, 2012 Nature Publishing Group UK, London, vol. 11, Nr: 3, pp. 217-222.

Ranjbarzadeh Ramin et al:"Empirical analysis of heat transfer and friction factor of water/graphene oxide flow in turbulent regime through an isothermal pipe"; Applied Thermal Engineering, Jul. 27, 2017 Pergamon, Oxford, GB vol. 126, pp. 538-547.

Park et al.:"Effects of nanofluids containing graphene/graphene-oxide nanosheets on critical heat flux"; Applied Physics Letters, Jul. 12, 2010 American Institute of Physics, 2 Huntington Quadrangle, Melville, NY 11747; vol. 97, Nr: 2, p. 23103.

Morimoto: "Tailoring the Oxygen Content of Graphite and Reduced Graphene Oxide for Specific Applications"; Scientific Reports, Apr. 1, 2016; vol. 6, Nr: 1.

Qing-Qiang Kong, Cheng-Meng Chen, Qiang Zhang, Xing-Hua Zhang, Mao-Zhang Wang, and Rong Cai: "Small Particles of Chemically-Reduced Graphene with Improved Electrochemical Capacity" The Journal of Physical Chemistry C 2013 117 (30), 15496-15504 DOI: 10.1021/jp403497u.

Chelgani, et al., A Review of Graphite Beneficiation Techniques, Mineral Processing And Extractive Metallurgy Review 2016; 37(1): 58-68 (Year: 2016).

Flores-Velez, et al., Graphene Oxide / Multilayer-Graphene Synthesized from Electrochemically Exfoliated Graphite and Its Influence on Mechanical Behavior of Polyurethane Composites, Materials Science and Applications 2018; 9: 565-575 (Year: 2018).

* cited by examiner

METHOD FOR THE MANUFACTURE OF REDUCED GRAPHENE OXIDE FROM KISH GRAPHITE

The present invention relates to a method for the manufacture of reduced graphene oxide from Kish graphite. In particular, reduced graphene oxide will have applications in metal industries including steel, aluminum, stainless steel, copper, iron, copper alloys, titanium, cobalt, metal composite, nickel industries, for example as coating or as a cooling reagent.

BACKGROUND

Kish graphite is a byproduct generated in the steelmaking process, especially during the blast furnace process or iron making process. Indeed, Kish graphite is usually produced on the free surface of molten iron during its cooling. It comes from molten iron at 1300-1500° C., which is cooled at a cooling rate between 0.40° C./min and 25° C./h when transported in the torpedo car or at higher cooling rates during the ladle transfer. An extensive tonnage of Kish graphite is produced annually in a steel plant.

Since Kish graphite comprises a high amount of carbon, usually above 50% by weight, it is a good candidate to produce graphene based materials. Usually, Graphene based materials include: graphene, graphene oxide, reduced graphene oxide or nanographite.

Reduced graphene oxide is composed of one or a few layers of graphene sheets containing some oxygen functional groups. Thanks to its interesting properties such as a high thermal conductivity and a high electrical conductivity, reduced graphene oxide, being hydrophobic, has many applications as mentioned above.

Usually, reduced graphene oxide is synthesized based on Hummer Method comprising the following steps:
- the oxidation of Kish graphite with sodium nitrate ($NaNO_3$), sulfuric acid ($H_2SO_4$) and sodium or potassium permanganate ($KMnO_4$) and
- the reduction of graphene oxide to obtain the reduced graphene oxide.

The patent KR101109961 discloses a method of manufacturing graphene, comprising:
- a step of pretreating Kish graphite,
- a step of manufacturing graphite oxide by oxidizing the pretreated Kish graphite with an acid solution;
- a step of manufacturing graphene oxide by exfoliating the graphite oxide and
- a step of manufacturing reduced graphene oxide by reducing the graphene oxide with a reducing agent.

In this Korean patent, the pre-treatment of Kish graphite comprises: a flushing process, a process of purification using a chemical pretreatment composition and a mechanical separation process (separation by size). After the process of purification, the purified Kish graphite is separated by size, the Kish graphite having a particle size of 40 mesh or less, i.e. 420 μm or less, is kept for the manufacture of graphene oxide.

However, the pretreatment of Kish graphite comprises 2 steps using a chemical composition: the flushing step and the process of purification step. In the Example of KR101109961, the flushing step is performed with an aqueous solution comprising water, hydrochloric acid and nitric acid. Then, the process of purification is performed with a pretreatment composition comprising a chelating agent, an iron oxide remover, a surfactant, an anionic and nonionic polymer dispersant and distilled water. At industrial scale, two chemical treatments are difficult to manage since a lot of chemical waste has to be treated and the stability of such composition is difficult to control.

Moreover, the pretreatment composition needs a long time preparation. The productivity is therefore slowed. Additionally, in the Example, the reduction of graphene oxide into reduced graphene oxide is very long since it is performed during 24 hours.

Finally, the pre-treatment of Kish graphite including the process of purification using the pretreatment composition and the oxidation of the pretreated Kish graphite performed with sodium nitrate ($NaNO_3$), sulfuric acid ($H_2SO_4$) and potassium permanganate ($KMnO_4$) are not environmentally friendly. Indeed, during the pretreatment of kish graphite, a lot of chemicals compounds are used. During the oxidation, the use of sodium nitrate results in the formation of toxic gases such as $NO_2$, $N_2O_4$ and $NH_3$ which are not environmentally friendly.

The publication called "Graphene oxide and reduced graphene oxide studied by the XDR, TEM and electron spectroscopy methods", Journal of electron spectroscopy and related phenomena, vol. 195, 1 Aug. 2014, pages 145-154, discloses reduced graphene oxide denoted as FL-RGOp and FL-RGOph. FL-RGOp comprises 8.6% by weight of oxygen. FL-RGOph comprises 12.1% by weight of oxygen.

However, the lateral size of both FL-RGOp and FL-RGOph are not mentioned in the publication.

The publication called "Tailoring the oxygen content of graphite and reduced graphene oxide for specific applications", Scientific Reports, vol. 6, no. 1, 25 Feb. 2016, discloses reduced graphene oxide having from 11.8% and 58.8% by weight of oxygen.

However, this publication is completely silent concerning the lateral size of the reduced graphene oxide.

The patent application WO2018178845 discloses a Method for the manufacture of reduced graphene oxide from kish graphite comprising:
A. The provision of kish graphite,
B. A pre-treatment step of said kish graphite comprising the following successive sub-steps:
  i. A sieving step wherein the kish graphite is classified by size as follows:
    a) Kish graphite having a size below 50 μm,
    b) Kish graphite having a size above or equal to 50 μm, the fraction a) of kish graphite having a size below 50 μm being removed,
  ii. A flotation step with the fraction b) of kish graphite having a size above or equal to 50 μm,
  iii. An acid leaching step wherein an acid is added so that the ratio in weight (acid amount)/(kish graphite amount) is between 0.25 and 1.0,
  iv. Optionally, the kish graphite is washed and dried,
C. An oxidation step of the pre-treated kish-graphite obtained after step B) in order to obtain graphene oxide and
D. A reduction of graphene oxide into reduced graphene oxide.

For example, the oxidation step C) comprises the preparation of a mixture comprising the pre-treated kish-graphite, an acid and optionally sodium nitrate, the mixture being kept at a temperature below 5° C. before the addition of an oxidizing agent.

Nevertheless, when the oxidation step is performed with sodium nitrate ($NaNO_3$), toxic gases are produced leading to a polluting method. Moreover, the oxidation time is very long using $NaNO_3$.

SUMMARY OF THE INVENTION

It is an object of the present invention to provide a less polluting method for the manufacture of reduced graphene oxide from Kish graphite compared to the conventional methods. Additionally or alternately, an object is to provide an industrial method to obtain reduced graphene oxide having good quality in the shortest time possible.

The present invention provides a method for the manufacture of reduced graphene oxide from kish graphite comprising: A. The provision of kish graphite, B. A pre-treatment step of said kish graphite comprising the following successive sub-steps: i. A sieving step wherein the kish graphite is classified by size as follows: a) kish graphite having a size below 50 μm, b) kish graphite having a size above or equal to 50 μm, the fraction a) of kish graphite having a size below 50 μm being removed, ii. a flotation step with the fraction b) of kish graphite having a size above or equal to 50 μm and iii. an acid leaching step wherein an acid is added so that the ratio in weight (acid amount)/(kish graphite amount) is between 0.25 and 1.0, C. an oxidation step of the pre-treated kish-graphite obtained after step B) in order to obtain graphene oxide comprising the following successive sub-steps: i. the preparation of a mixture comprising the pre-treated kish-graphite, an acid and ammonium nitrate (NH4NO3), the mixture being kept at a temperature below 5° C., ii. the addition of an oxidizing agent into the mixture obtained in step C.i), iii. after the targeted level of oxidation is reached, the addition of a chemical element to stop the oxidation reaction, iv. optionally, the separation of graphite oxide from the mixture obtained in step C.iii) and v. the exfoliation of graphite oxide into graphene oxide and D. a reduction of graphene oxide into reduced graphene oxide.

The invention also provides reduced Graphene oxide comprising below 20% by weight of oxygen functional groups and having an average lateral size below 30 μm comprising at least one layer sheet manufactured according to the method.

The following terms are defined:
Graphene oxide means one or a few layer(s) of graphene comprising at least 45% by weight of oxygen functional groups including ketone groups, carboxyl groups, epoxy groups and hydroxyl groups,
Reduced graphene oxide means graphene oxide that has been reduced. The reduced graphene oxide comprises one or a few layer(s) of graphene having some oxygen functional groups and
A flotation step means a process for selectively separating Kish graphite which is hydrophobic material from hydrophilic materials.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
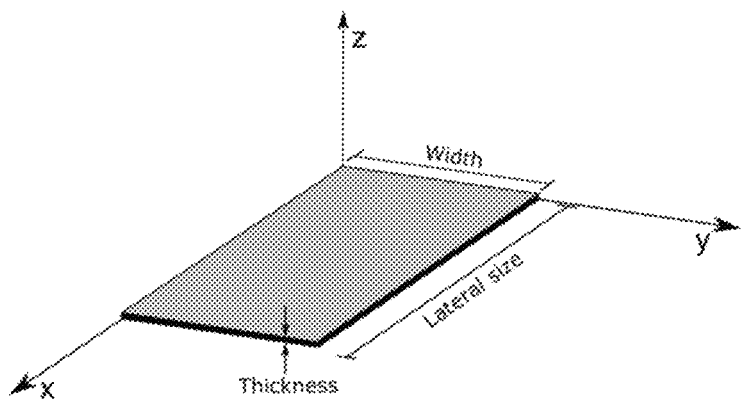
FIG. 1 illustrates an example of one layer of reduced graphene oxide according to the present invention.

The invention relates to a method for the manufacture of reduced graphene oxide from kish graphite comprising:

A. the provision of kish graphite,
B. a pre-treatment step of said kish graphite comprising the following successive sub-steps:
   i. a sieving step wherein the kish graphite is classified by size as follows:
      a) kish graphite having a size below 50 μm,
      b) kish graphite having a size above or equal to 50 μm,
      the fraction a) of kish graphite having a size below 50 μm being removed,
   ii. a flotation step with the fraction b) of kish graphite having a size above or equal to 50 μm and
   iii. an An acid leaching step wherein an acid is added so that the ratio in weight (acid amount)/(kish graphite amount) is between 0.25 and 1.0,
C. an oxidation step of the pre-treated kish-graphite obtained after step B) in order to obtain graphene oxide comprising the following successive sub-steps:
   i. the preparation of a mixture comprising the pre-treated kish-graphite, an acid and ammonium nitrate ($NH_4NO_3$), the mixture being kept at a temperature below 5° C.,
   ii. the addition of an oxidizing agent into the mixture obtained in step C.i),
   iii. after the targeted level of oxidation is reached, the addition of an element to stop the oxidation reaction,
   iv. optionally, the separation of graphite oxide from the mixture obtained in step C.iii) and
   v. the exfoliation of graphite oxide into graphene oxide
D. a reduction of graphene oxide into reduced graphene oxide.

Without willing to be bound by any theory, it seems that the method according to the present invention allows for the production of reduced graphene oxide having good quality from high purity pre-treated Kish graphite. Indeed, the Kish graphite obtained after step B) has a purity of at least 90%. Moreover, the method including the pre-treatment of kish graphite, the oxidation into graphene oxide and the reduction of graphene oxide is easy to implement at industrial scale and is less polluting than methods of the prior art, in particular the one using $NaNO_3$. Indeed, on the one hand, it is believed that the no toxic gases produced during the oxidation are $N_2$, $O_2$ and $H_2O$ with $NH_4NO_3$ instead of $NO_2$, $N2O_4$ and $NH_3$ with $NaNO_3$. On the other hand, the amount of gases produced with $NH_4NO_3$ is higher than the one produced with $NaNO_3$. Thus, more gases are intercalated between the kish graphite layers so that during the oxidation step C.ii), $KMnO_4$ can easily navigate between the kish graphite layers and oxidize them. It results in a significant reduction of the oxidation time compared to $NaNO_3$.

Preferably, in step A), the Kish graphite is a residue of the steelmaking process. For example, it can be found in a blast furnace plant, in an iron making plant, in the torpedo car and during ladle transfer.

In step B.i), the sieving step can be performed with a sieving machine.

After the sieving, the fraction a) of Kish graphite having a size below 50 μm is removed. Indeed, without willing to bound by any theory, it is believed that the kish graphite having a size below 50 μm contains a very small quantity of graphite, for example less than 10%.

Preferably in step B.ii), the flotation step is performed with a flotation reagent in an aqueous solution. For example, the flotation reagent is a frother selected from among: methyl isobutyl carbinol (MIBC), pine oil, polyglycols, xylenol, S-benzyl-S'-n-butyl trithiocarbonate, S,S'-dimethyl trithiocarbonate and S-ethyl-S'-methyl trithiocarbonate. Advantageously, the flotation step is performed using a flotation device.

Preferably, in step B.i), the fraction a) of kish graphite having a size below 55 μm is removed and in step B.ii), the fraction b) of kish graphite has a size above or equal to 55 μm. More preferably, in step B.i), the fraction a) of kish graphite having a size below 60 μm is removed and wherein in step B.ii), the fraction b) of kish graphite has a size above or equal to 60 μm.

Preferably, in steps B.i) and B.ii), the fraction b) of kish graphite has a size below or equal to 300 μm, any fraction of kish graphite having a size above 300 μm being removed before step B.ii).

More preferably in steps B.i) and B.ii), the fraction b) of kish graphite has a size below or equal to 275 μm, any fraction of kish graphite having a size above 275 μm being removed before step B.ii).

Advantageously, in steps B.i) and B.ii), the fraction b) of kish graphite has a size below or equal to 250 μm, any fraction of kish graphite having a size above 250 μm being removed before step B.ii).

In step B.iii), the (acid amount)/(kish graphite amount) ratio in weight is between 0.25 and 1.0, advantageously between 0.25 and 0.9, more preferably between 0.25 and 0.8. For example, the (acid amount)/(kish graphite amount) ratio in weight is between 0.4 and 1.0, between 0.4 and 0.9 or between 0.4 and 1. Indeed, without willing to be bound by any theory, it seems that if the (acid amount)/(kish graphite amount) ratio is below the range of the present invention, there is a risk that the kish graphite comprises a lot of impurities. Moreover, it is believed that if the (acid amount)/(kish graphite amount) ratio is above the range of the present invention, there is a risk that a huge amount of chemical waste is generated.

Preferably, in step B.iii), the acid is selected among the following elements: chloride acid, phosphoric acid, sulfuric acid, nitric acid or a mixture thereof.

Then, optionally, the kish graphite is washed and dried.

The pre-treated Kish graphite obtained after step B) of the method according to the present invention has a size above or equal to 50 μm. The pre-treated Kish graphite has a high purity, i.e. at least of 90%. Moreover, the degree of crystallinity is improved compared to conventional methods allowing higher thermal and electrical conductivities and therefore higher quality.

In step C.i), the pre-treated kish graphite is mixed with an acid and ammonium nitrate ($NH_4NO_3$). Preferably in step C.i), the acid is selected among the following elements: chloride acid, phosphoric acid, sulfuric acid, nitric acid or a mixture thereof. In a preferred embodiment, the mixture comprises the pre-treated kish-graphite, sulfuric acid and ammonium nitrate.

Preferably in step C.ii), the oxidizing agent is chosen from: potassium permanganate ($KMnO_4$), $H_2O_2$, $O_3$, $H_2S_2O_8$, $H_2SO_5$, $KNO_3$, NaClO or a mixture thereof. In a preferred embodiment, the oxidizing agent is potassium permanganate.

Then, in step C.iii), when the targeted level of oxidation is reached, a chemical element is added to stop the oxidation. The targeted level of oxidation depends on the oxidation degree of graphene oxide, i.e. having at least 45% by weight of oxygen groups according to the present invention. The level of oxidation of graphene oxide can be analyzed by scanning electron microscopy (SEM), X ray diffraction spectroscopy (XRD), Transmission electron microscopy (TEM), LECO analysis and/or Raman spectroscopy over time during the oxidation.

Then, advantageously in step C.iii), the chemical element used to stop the oxidation reaction is chosen from: an acid, non-deionized water, deionized water, $H_2O_2$ or a mixture thereof.

In a preferred embodiment, when at least two elements are used to stop the reaction, they are used successively or simultaneously. Preferably, deionized water is used to stop the reaction and then $H_2O_2$ is used to eliminate the rest of the oxidizing agent. In another preferred embodiment, $H_2O_2$ is used to stop the reaction and eliminate the rest of the oxidizing agent. In another preferred embodiment, $H_2O_2$ is used to stop the reaction by this following reaction:

$$2KMnO_4+3H_2O_2=2MnO_2+3O_2+2KOH+2H_2O.$$

Then, to eliminate $MnO_2$, an acid can be used. For example, HCl is added to the mixture so that the following reaction happens:

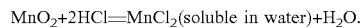

$$MnO_2+2HCl=MnCl_2(\text{soluble in water})+H_2O.$$

Without willing to be bound by any theory, it seems that when the element to stop the reaction is added into the mixture, there is a risk that this addition is too exothermic resulting in explosion or splashing. Thus, preferably in step C.iii), the element used to stop the reaction is slowly added into the mixture obtained in step C.ii). More preferably, the mixture obtained in step C.ii) is gradually pumped into the element used to stop the oxidation reaction. For example, the mixture obtained in step C.ii) is gradually pumped into deionized water to stop the reaction.

In step C.iv), graphite oxide is separated from the mixture obtained in step C.iii). Preferably, the graphite oxide is separated by centrifugation, by decantation or filtration.

Then, optionally, the graphite oxide is washed. For example, the graphite oxide is washed with an element chosen from among: deionized water, non-deionized water, an acid or a mixture thereof. For example, the acid is selected among the following elements: chloride acid, phosphoric acid, sulfuric acid, nitride acid or a mixture thereof.

After, optionally, the graphite oxide is dried, for example with air or at high temperature in the vacuum condition.

Preferably in step C.v), the exfoliation is performed by using ultrasound or thermal exfoliation. Preferably, the mixture obtained in step C.iii) is exfoliated into one or a few layers of graphene oxide.

After step C), Graphene oxide comprising at least 45% by weight of oxygen functional groups and having an average lateral size between 5 and 50 μm, preferably between 10 and 40 μm and more preferably between 10 and 30 μm comprising at least one layer sheet is obtained.

Then, preferably, in step D), the graphene oxide is partially or completely reduced in order to obtain a reduced graphene oxide having from 0.4% to 25% by weight, more preferably from 1 to 20% of oxygen groups.

Preferably, step D) comprises the following sub-steps:
  i. The reduction of graphene oxide with a reducing agent,
  ii. agitation of the mixture obtained in step D.i),
  iii. optionally, the washing of the reduced graphene oxide and
  iv. optionally, the drying of the reduced graphene oxide.

In step D.i), preferably, the reducing agent is chosen from: acid ascorbic; urea; hydrazine hydrate; alkaline solution such as NaOH or KOH; phenols such as gallic acid, tannin acid, dopamine or tea polyphenol; alcohols such as methyl alcohol, ethyl alcohol or isopropyl alcohol; glycine; sodium citrate or sodium borohydride. More preferably, the reducing agent is acid ascorbic since the ascorbic acid is more environmentally friendly.

Advantageously, in step D.ii), the mixture is kept at a temperature between 50 and 120° C., more preferably between 60 and 95° C. and advantageously between 80 and 95° C. Preferably, the agitation is performed during less 24 hours, more preferably during less than 15 hours and advantageously during 1 to 10 hours.

By applying the method according of the present invention, reduced graphene oxide comprising below 20% by weight of oxygen functional groups and having an average lateral size below 30 μm preferably below 20 μm and more preferably below 10 μm comprising at least one layer sheet is obtained.

FIG. 1 illustrates an example of one layer of reduced graphene oxide according to the present invention. The lateral size means the highest length of the layer through the X axis, the thickness means the height of the layer through the Z axis and the width of the nanoplatelet is illustrated through the Y axis.

Figure 2:
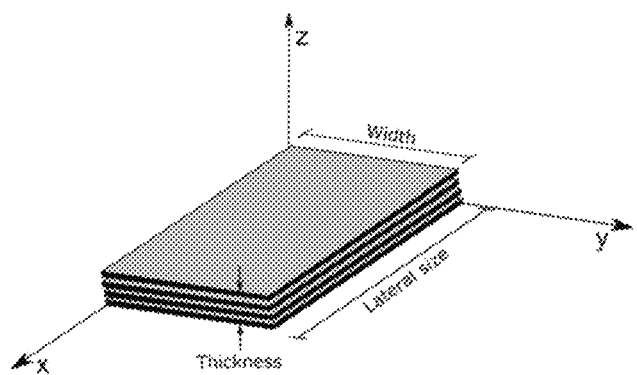
FIG. 2 illustrates an example of a few layers of reduced graphene oxide according to the present invention.

FIG. 2 illustrates an example of a few layers of reduced graphene oxide according to the present invention. The lateral size means the highest length of the layer through the X axis, the thickness means the height of the layer through the Z axis and the width of the nanoplatelet is illustrated through the Y axis.

Preferably, reduced graphene oxide is deposited on metallic substrate steel to improve some properties such as corrosion resistance of a metallic substrate.

In another preferred embodiment, reduced graphene oxide is used as cooling reagent. Indeed, graphene oxide can be added to a cooling fluid. Preferably, the cooling fluid can be chosen from among: water, ethylene glycol, ethanol, oil, methanol, silicone, propylene glycol, alkylated aromatics, liquid Ga, liquid In, liquid Sn, potassium formate and a mixture thereof. In this embodiment, the cooling fluid be used to cool down a metallic substrate. For example, the metallic substrate is selected from among: aluminum, stainless steel, copper, iron, copper alloys, titanium, cobalt, metal composite, nickel.

The invention will now be explained in trials carried out for information only. They are not limiting.

Examples

Trials 1, 2 and 3 were prepared by providing Kish graphite from steelmaking plant. Then, Kish graphite was sieved to be classified by size as follows:
a) Kish graphite having a size below <63 μm and
b) Kish graphite having a size above or equal to 63 μm.

The fraction a) of Kish graphite having a size below 63 μm was removed.

For Trials 1 and 2, a flotation step with the fraction b) of Kish graphite having a size above or equal to 63 μm was performed. The flotation step was performed with a Humboldt Wedag flotation machine with MIBC as frother. The following conditions were applied:
Cell volume (l): 2,
Rotor speed (rpm): 2000,
Solid concentration (%): 5-10,
Frother, type: MIBC,
Frother, addition (g/T): 40,
Conditioning time(s): 10 and
Water conditions: natural pH, room-temperature.

All Trials were then leached with the hydrochloric acid in aqueous solution. Trials were then washed with deionized water and dried in air at 90° C.

After, Trial 1 was mixed with ammonium nitrate and sulfuric acid while Trials 2 and 3 were mixed with sodium nitrate and sulfuric acid in an ice-bath. Potassium permanganate was slowly added into Trials 1 to 3. Then, mixtures were transferred into water bath and kept at 35° C. to oxidize the Kish graphite.

After the oxidation, Trials were gradually pumped into deionized water.

For Trial 1, the heat was removed and $H_2O_2$ in aqueous solution was added until there was no gas producing. $MnO_2$ was produced. Then, HCl was added to the mixture to eliminate $MnO_2$.

For Trials 2 and 3, After stopping the oxidation reaction, the heat was removed and $H_2O_2$ in aqueous solution was added until there was no gas producing and mixtures were stirred to eliminate the rest of $H_2O_2$.

Then, for all Trials, Graphite oxide was separated from the mixture by decantation. They were exfoliated using ultrasound in order to obtain one or two layer(s) of graphene oxide. Finally, graphene oxide was separated from the mixture by centrifugation, washed with water and dried with air.

L-ascorbic acid were mixed with aqueous solutions of Trials 1 to 3. The reaction mixtures were agitated at 90° C. to reduce the graphene oxide sheets. All Trials were then washed and dried to obtain reduced graphene oxide powder.

Graphene oxide and Reduced graphene oxide were analyzed by scanning electron microscopy (SEM), X ray diffraction spectroscopy (XRD), Transmission electron microscopy (TEM), LECO analysis and Raman spectroscopy.

Trials 2 and 3 correspond respectively to Trials 1 and 2 of WO2018178845. Table 1 shows the results obtained.

| Method | | Trial 1 * | Trial 2 (Trial 1 of WO2018178845) | Trial 3 (Trial 2 of WO2018178845) |
|---|---|---|---|---|
| Pre-treatment of Kish graphite | Origin of Kish graphite | Steelmaking plant | Steelmaking plant | Steelmaking plant |
| | Sieving step | Done, Kish graphite having a size above or equal to 63 μm kept | Done, Kish graphite having a size above or equal to 63 μm kept | Done, Kish graphite having a size above or equal to 63 μm kept |
| | Flotation step | Done | Done | Not done |
| | Acid leaching step | Done with HCl, (the acid amount)/(kish graphite amount) ratio in weight is of 0.78 | Done with HCl, (the acid amount)/(kish graphite amount) ratio in weight is of 0.78 | Done with HCl, (the acid amount)/(kish graphite amount) ratio in weight is of 1.26 |
| Pre-treated kish graphite purity | | 95% | 95% | 74.9% |

-continued

| Method | Trial 1 * | Trial 2 (Trial 1 of WO2018178845) | Trial 3 (Trial 2 of WO2018178845) |
|---|---|---|---|
| Oxidation step — preparation of the mixture | Done with $H_2SO_4$ and $NH_4NO_3$ | Done with $H_2SO_4$ and $NH_4NO_3$ | Done with $H2SO_4$ and $NH_4NO_3$ |
| Gases produced | $N_2$, $O_2$ and $H_2O$ | $NO_2$, $N_2O_4$ and $NH_3$ | $NO_2$, $N_2O_4$ and $NH_3$ |
| Addition of an oxidizing agent | $KMNO_4$ | $KMNO_4$ | $KMNO_4$ |
| Oxidation time | 1 h 30 min | 3 hours | 3 hours |
| Element to stop the reaction | Water followed by $H_2O_2$ | Water followed by $H_2O_2$ | Water followed by $H_2O_2$ |
| Exfoliation | Ultrasound | Ultrasound | Ultrasound |
| Graphene oxide | Graphene oxide comprising 49% of oxygen groups and having an average Lateral size from 10 to 20 μm with purity of 99.5% | Graphene oxide comprising 40% of oxygen groups and having an average Lateral size from 20 to 35 μm with purity of 99.5% | Graphene oxide comprising 30% of oxygen groups and having an average lateral size from 20 to 35 μm with purity of 99.5% |
| Reduction step | Done with acid ascorbic during 3 hours | Done with acid ascorbic during 3 hours | Done with acid ascorbic during 3 hours |
| Reduced graphene oxide | Reduced Graphene oxide comprising 17% of oxygen groups and having an average Lateral size from 15 to 30 μm 99.5% and an average thickness of 1-6 nm | Reduced Graphene oxide comprising 15% of oxygen groups and having an average Lateral size from 20 to 30 μm with purity of 99.5% and an average thickness of 1-6 nm | Reduced Graphene oxide comprising 15% of oxygen groups and having an average Lateral size from 20 to 30 μm with purity of 99.0% and an average thickness of 1-6 nm |

* according to the present invention

The method of Trial 1 is more environmentally friendly than the method used for Trials 2 and 3. Moreover, the oxidation time with the method of Trial 1 is divided by two. Finally, the reduced graphene oxide obtained with Trial 1 has a high quality.

What is claimed is:

1. A method for manufacture of reduced graphene oxide from kish graphite comprising:
   A. providing kish graphite,
   B. pre-treating the kish graphite including the following successive sub-steps:
      i. a sieving step wherein the kish graphite is classified by size as follows:
         a) kish graphite having a size below 50 μm,
         b) kish graphite having a size above or equal to 50 μm,
         the fraction a) of kish graphite having a size below 50 μm being removed,
      ii. a flotation step with the fraction b) of kish graphite having a size above or equal to 50 μm and
      iii. an acid leaching step wherein an acid is added so that a ratio in weight (acid amount)/(kish graphite amount) is between 0.25 and 1.0,
   C. oxidizing the pre-treated kish-graphite obtained after step B) in order to obtain graphene oxide including the following successive sub-steps:
      i. preparation of a mixture including the pre-treated kish-graphite, an acid and ammonium nitrate ($NH_4NO_3$), the mixture being kept at a temperature below 5° C.,
      ii. addition of an oxidizing agent into the mixture obtained in step C.i),
      iii. after a targeted level of oxidation is reached, addition of a chemical element to stop the oxidation reaction,
      iv. optionally, separation of graphite oxide from the mixture obtained in step C.iii) and
      v. exfoliation of the graphite oxide from the mixture obtained in step C.iii) into graphene oxide, and
   D. reducing of the graphene oxide into reduced graphene oxide.

2. The method as recited in claim 1 wherein in step B.i), a fraction a) of kish graphite having a size below 55 μm is removed and in step B.ii), a fraction b) of kish graphite has a size above or equal to 55 μm.

3. The method as recited in claim 2 wherein in steps B.i) and B.ii), the fraction b) of kish graphite has a size below or equal to 300 μm, any fraction of kish graphite having a size above 300 μm being removed before step B.ii).

4. The method as recited in claim 1 wherein in step B.iii), the acid amount/kish graphite amount ratio in weight is between 0.25 and 0.9.

5. The method as recited in claim 1 wherein in step B.iii), the acid is selected from the group consisting of the following elements: chloride acid, phosphoric acid, sulfuric acid, nitric acid and a mixture thereof.

6. The method as recited in claim 1 wherein in step C.ii), the oxidizing agent is chosen from the group consisting of: potassium permanganate (KMnO4), $H_2O_2$, $O_3$, $H_2S_2O_8$, $H_2SO_5$, $KNO_3$, NaClO and a mixture thereof.

7. The method as recited in claim 1 wherein in step C.iii), the chemical element used to stop the oxidation reaction is chosen from the group consisting of: an acid, non-deionized water, deionized water, $H_2O_2$ and a mixture thereof.

8. The method as recited in claim 7 wherein the chemical element and a further chemical element chosen from the group are used to stop the oxidation reaction, the element and the further chemical element being used successively.

9. The method as recited in claim 7 wherein the chemical element and a further chemical element chosen from the group are used to stop the oxidation reaction, the element and the further chemical element being used simultaneously.

10. The method as recited in claim 1 wherein in step C.iii), the mixture obtained in step C.ii) is gradually pumped into the element used to stop the oxidation reaction.

11. The method as recited in claim 1 wherein in step C.vii), the exfoliation is performed by using ultrasound or thermal exfoliation.

12. The method as recited in claim 1 wherein step C.iv) is performed and the graphite oxide is separated by centrifugation, by decantation or filtration.

13. The method as recited in claim 1 wherein in step C.i), the acid is selected from the group consisting of the following elements: chloride acid, phosphoric acid, sulfuric acid, nitric acid and a mixture thereof.

14. The method as recited in claim 1 wherein in step D) includes the following sub-steps:
   i. reduction of graphene oxide to reduced graphene oxide with a reducing agent,
   ii. agitation of the mixture obtained in step D.i),
   iii. optionally, washing of the reduced graphene oxide and
   iv. optionally, drying of the reduced graphene oxide.

15. The method as recited in claim 4 wherein in step D.ii), the mixture is kept at a temperature between 5° and 120° C.

16. The method as recited in claim 4 wherein in step D.ii), the agitation is performed during less than 24 hours.

17. The method as recited in claim 14 wherein in step D.i), the reducing agent is chosen from the group consisting of: acid ascorbic; urea; hydrazine hydrate; alkaline solution; phenols; alcohols; glycine; sodium citrate and sodium borohydride.

18. The method as recited in claim 17, wherein the alcohols are one or more of methyl alcohol, ethyl alcohol and isopropyl alcohol.

19. The method as recited in claim 17, wherein the alkaline solution is a solution of NaOH or KOH.

20. The method as recited in claim 17, wherein the phenols are one or more of gallic acid, tannin acid, dopamine or tea polyphenol.

* * * * *